H. HARDEN.
SEEDER ATTACHMENT FOR GANG AND SULKY PLOWS.
APPLICATION FILED NOV. 29, 1912.
1,092,358.
Patented Apr. 7, 1914.
2 SHEETS—SHEET 1.
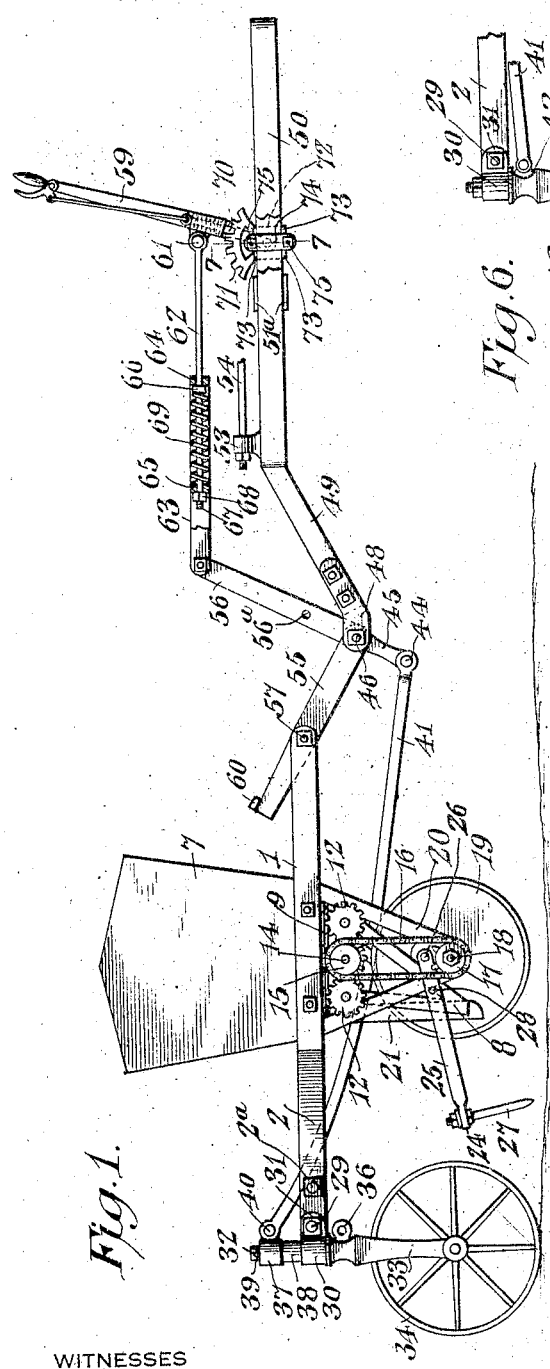
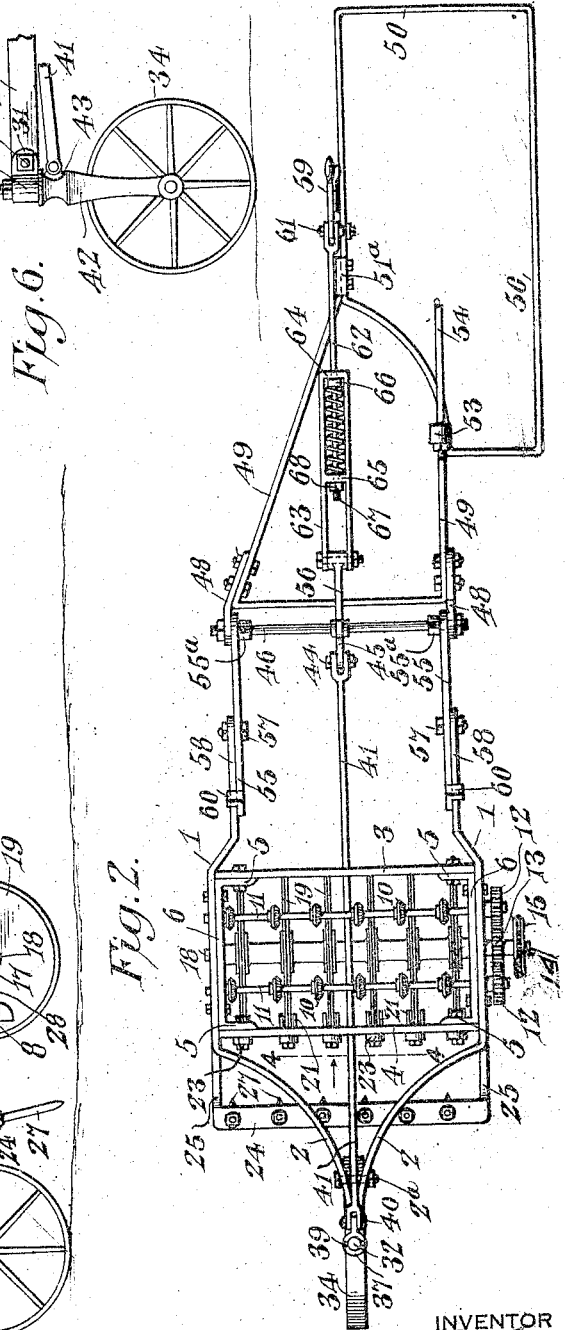
WITNESSES
INVENTOR
Harry Harden,
BY
ATTORNEY

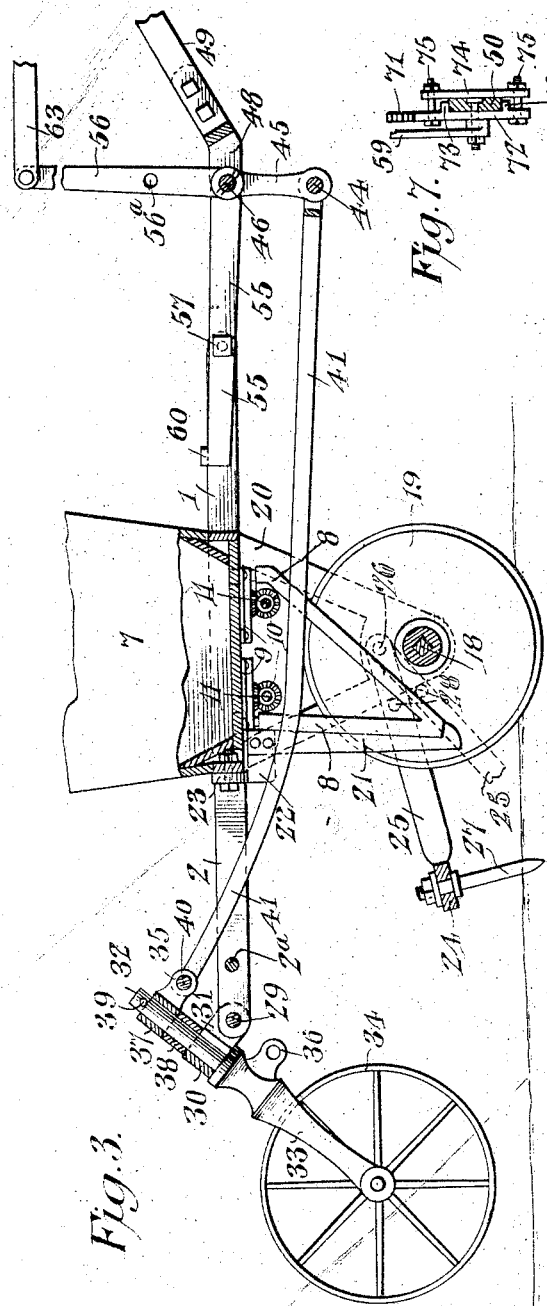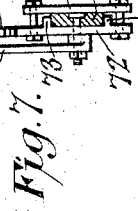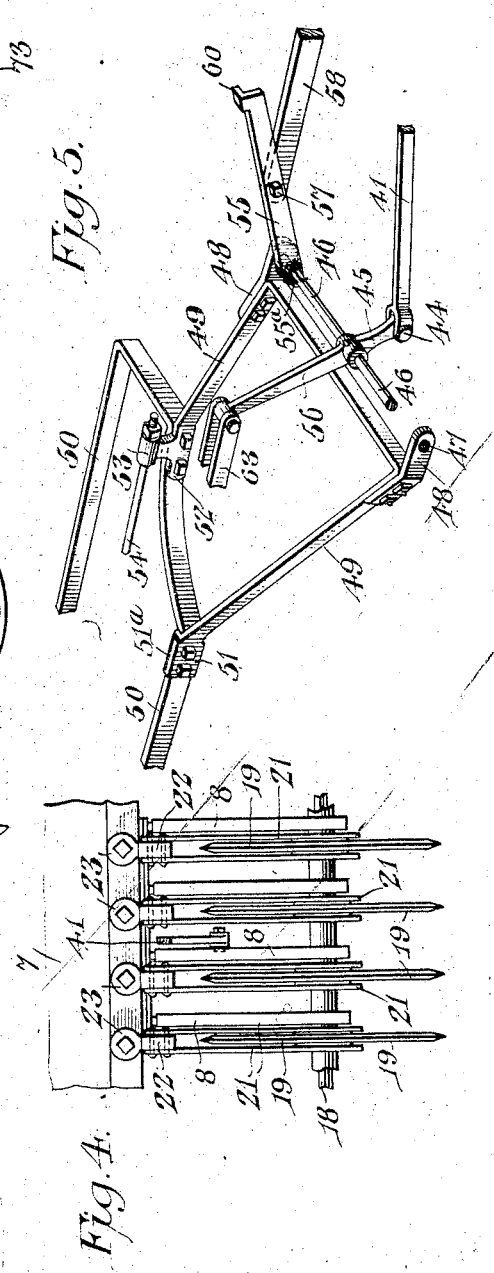

UNITED STATES PATENT OFFICE.

HARRY HARDEN, OF LONDON, OHIO, ASSIGNOR OF ONE-HALF TO ROBERT LINCOLN FARRAR, OF LONDON, OHIO.

SEEDER ATTACHMENT FOR GANG AND SULKY PLOWS.

1,092,358.  Specification of Letters Patent.  Patented Apr. 7, 1914.

Application filed November 29, 1912. Serial No. 734,220.

*To all whom it may concern:*

Be it known that I, HARRY HARDEN, a citizen of the United States, residing at London, in the county of Madison and State of Ohio, have invented a new and useful Seeder Attachment for Gang and Sulky Plows, of which the following is a specification.

The invention relates to a seeder attachment for gang and sulky plows.

The object of the present invention is to provide a simple, efficient and comparatively inexpensive seeder attachment, adapted to be readily applied to gang and sulky plows, and equipped with mechanism capable of easy operation to lower the seeder to arrange the parts for planting and also to elevate the seeder to raise the soil engaging devices clear of the ground.

A further object of the invention is to provide means adapted to yieldably hold the soil engaging devices in the ground, and capable of permitting the same should they encounter a small stump, rock or other obstruction of being thrown upwardly by the same without injuring the machine.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a seeder attachment, constructed in accordance with this invention. Fig. 2 is a plan view of the same. Fig. 3 is a longitudinal sectional view, the rear carrying or supporting wheel being swung rearwardly and upwardly to lower the seeder disks and the harrow into the ground. Fig. 4 is an enlarged transverse sectional view on the line 4—4 of Fig. 2. Fig. 5 is a detail perspective view, illustrating the manner of mounting the bell crank member, which raises and lowers the front of the seeder frame. Fig. 6 is a detail view showing the longitudinal connecting rod pivoted to the stem of the caster wheels at a point below the seeder frame. Fig. 7 is a detail sectional view on the line 7—7 of Fig. 1. Fig. 8 is a detail sectional view, illustrating the construction of one of the terminals of the inclined frame or support.

Like numerals of reference designate corresponding parts in all the figures of the drawings.

In the accompanying drawings in which is illustrated the preferred embodiment of the invention, 1 designates a trailing seeder frame preferably constructed of metal and composed of side bars having spaced front and intermediate portions and provided with converging rear portions 2, forming a tapered rear portion to the frame and connected adjacent to their rear terminals by a bolt $2^a$, which is adapted to draw the said rear terminals together. The intermediate portions of the side bars are arranged in parallelism and are connected by spaced front and rear transverse bars 3 and 4, bolted or otherwise secured to inwardly extending terminals 5 of attaching bars or members 6, which are secured to the inner faces of the said intermediate portions of the side bars.

The transverse connecting bars of the seeder frame support a seed box 7, and the discharge of the seed to a transverse series of seed spouts 8 is controlled by suitable seed dropping mechanism 9, which is connected by beveled gearing 10 with parallel transverse shafts 11 journaled in suitable bearings at the sides of the seeder frame. The transverse shafts 11 extend from one side of the seeder frame and have keyed or otherwise secured to them spur gears 12, which mesh with a central spur gear 13, mounted on a stud shaft 14 and connected with a sprocket gear 15. The sprocket gear 15 meshes with a sprocket chain 16, which extends downwardly to a lower sprocket gear 17, mounted on the axle 18, which carries a series of disks 19. The axle is journaled in suitable bearings of approximately V-shaped standards 20, secured to and depending from the seeder frame at opposite sides of the intermediate portion thereof. When the seeder frame is lowered by the means hereinafter described to permit the disks to penetrate the soil, their rotary movement is communicated to and actuates the seed dropping mechanism. As the seed dropping mechanism does not constitute a portion of the present invention and as any seed dropping mechanism may be employed, specific illustration and description thereof are deemed unnecessary.

Connected with and depending from the rear transverse connecting bar 4 of the seeder frame is a series of scrapers 21, each consisting of a pair of vertically disposed spaced bars or members secured at their upper ends to the side faces of approximately L-shaped brackets 22, consisting of rear upwardly projecting eyes 23 and forwardly extending horizontal arms or portions. The eyes 23 are preferably bolted or otherwise secured to the rear face of the rear transverse bar, but they may be secured to the seeder frame in any other desired manner. The horizontal portions or arms extend forwardly beneath the rear transverse bar and support the scraper bars or members.

The machine is also equipped with a harrow provided with an approximately U-shaped frame 24 composed of a transverse tooth supporting bar and forwardly extending sides or arms 25, which are connected at their front ends to the V-shaped standards by suitable pivots 26. The teeth 27 of the harrow are suitably secured at their upper ends to the transverse tooth supporting bar or portion of the harrow frame, which is adapted to swing upwardly and downwardly, the downward movement being limited by lugs or projections 28, extending from the sides or arms of the harrow frame and arranged to abut against the V-shaped standards. By limiting the relative downward movement of the harrow, the latter is prevented from dropping too low and is adapted to be lifted out of the ground by the seeder attachment when the same is raised. When the harrow teeth are at the limit of their downward movement, their lower ends or points are preferably arranged in the same plane as the lower edges of the disks.

Pivoted to the end of the tapered portion of the frame by a horizontal bolt 29, or other suitable fastening device is a bearing 30 preferably consisting of a split collar having forwardly extending terminals 31 embracing the rear end of the seeder frame and pierced by the horizontal pivot 29. The bearing receives an upper rounded portion or stem 32 of a forked standard 33 in which is mounted a rear supporting caster wheel 34, adapted to be carried by the oscillation of the standard to a position beneath the rear portion of the seeder frame, as illustrated in Fig. 1 of the drawings, to support the disks and harrow teeth above the surface of the ground and capable of being swung rearwardly and upwardly to a position above the surface of the ground to permit the soil engaging devices to penetrate the ground. The rear supporting wheel may also be adjusted to run upon the ground and limit the penetration of the soil engaging devices.

The standard is equipped with upper and lower ears 35 and 36, located above and below the seeder frame. The upper ear 35 is formed integral with a collar 37, arranged on the upper portion 32 of the standard and spaced from the bearing collar 30 by a sleeve 38 and retained in place by a transverse pin or key 39. The standard is adapted to be pivoted above the frame by a bolt 40 or other suitable fastening device to the rear end of a longitudinal connecting bar 41, as illustrated in Figs. 1 to 3 inclusive, or it may be connected below the frame to the lower ear 36, and if desired a standard 42 having only a lower integral ear 43 may be employed, as illustrated in Fig. 6 of the drawings. When the longitudinal connecting bar is pivoted to the upper ear, it is bent slightly to arrange it clear of the seed box and the seed dropping mechanism, and its front end is pivoted by a bolt 44 to a central depending arm 45 of a transverse rock shaft 46, journaled in transversely alined openings 47 of bearing plates 48, secured to and projecting rearwardly from an inclined frame or support 49. The inclined frame or support, which projects laterally and rearwardly from the front plow frame 50, is composed of sides and a rear transverse connecting portion. The bearing plates 48 are secured to the outer faces of the sides of the inclined connecting frame or support and the front terminals of the sides of the latter form attaching portions 51 and 52, and are bolted or otherwise secured to the plow frame 50, which in practice may constitute the frame of either a gang or sulky plow, the seeder attachment being adapted to be applied to either. The enlarged terminal attaching portion 51 is provided with upper and lower flanges 51ª, arranged at the upper and lower edges of the adjacent portion of the plow frame 50, as clearly illustrated in Fig. 8 of the drawings. The attaching terminal 52 of the inclined frame or support 49 is provided with an integral upwardly projecting portion having a horizontally disposed eye 53, designed to receive the lifting rod 54 of the plow.

The transverse rock shaft 46 is equipped at its ends with upwardly and rearwardly extending arms 55, located at the ends of the shaft 46 and arranged at substantially right angles to a central upwardly and forwardly extending arm 56 and constituting with the same and the connecting rock shaft a bell crank lever or member for raising and lowering the front portion of the seeder frame. The arms 55 are provided at their front ends with annular bosses 55ª, which are keyed or otherwise secured to the transverse shaft 46. The arm 56 is provided at an intermediate point with a perforation 56ª, adapted to receive a connecting rod when the latter is pivoted to the lower eye 36 of the standard. The arms 55 are pivoted at an intermediate point by bolts 57 to the front terminals of the sides of the seeder frame, the side bars of the seeder frame projecting in advance of the seed box to form relatively rigid forwardly extending arms 58, which are inwardly bent and arranged in parallelism, as clearly illustrated in Fig. 2 of the drawings. The bell crank member is controlled by an operating lever 59, extending upwardly from and pivotally mounted at its lower end on the plow frame 50 and adapted when moved rearwardly to swing the pivoted standard rearwardly and upwardly and to lower simultaneously the front portion of the seeder frame, the relative downward movement of the seeder frame and the arms 55 being limited by lugs 60, extending laterally from the rear ends of the arms 55 and arranged to engage the upper edges of the sides of the seeder frame to form a rigid or stiff connection to enable the weight of the plow to be thrown on the seeder frame. The simultaneous downward movement of the seeder frame and the upward movement of the rear supporting wheel lower the disks and the harrow frame to the ground and permit the disks and the harrow teeth to penetrate the soil.

The operating lever is connected by a pivot 61 to the front end of a longitudinal connecting rod 62, which has its rear portion slidably mounted in a substantially oblong connecting member 63, composed of spaced sides and front and rear connecting portions 64 and 65, having longitudinally alined perforations through which the rear portion of the connecting rod 62 passes. The connecting rod is provided at its rear portion with a fixed collar or stop 66, and its rear end 67 is threaded for the reception of a nut 68, which is arranged at the rear face of the rear transverse portion 65. A coiled spring 69, which is disposed on the rear portion of the connecting rod 62, is interposed between the rear transverse portion 65 and the collar or stop 66 and operates to yieldably maintain the soil engaging devices in the soil and is adapted to permit the same to be thrown upwardly without injury to the machine should they come in contact with a rock or other obstruction. When the operating lever is pulled forwardly to swing the caster wheel beneath the rear end of the seeder frame and to elevate the front portion thereof, the nut 68 engages the rear transverse connecting portion 65 and forms a rigid connection between the operating lever and the bell crank member. The operating lever is equipped with a spring actuated dog or detent 70 controlled by a latch lever and arranged to engage a toothed segment 71, which is mounted on the plow frame 50 at one side thereof. The toothed segment 71 has a lower attaching portion 72 provided with spaced inwardly extending upper and lower flanges 73, fitting against and embracing the upper and lower edges of the adjacent side of the plow frame and retained in engagement with the same by a clip plate 74 and bolts 75. The clip plate 74 fits against the inner face of the plow frame and the bolts 75, which coöperate with the clip plate to form a clamp for securing the toothed segment to the plow frame, pierce the upper ends of the clip plate and the lower attaching portion of the toothed segment. In the accompanying drawings the frame 49 is shown extending downwardly and laterally from the left hand side of the plow frame, but it may extend from either side thereof and provide either a right hand or left hand seeder attachment.

What is claimed is:—

1. In an attachment of the class described, the combination with a front plow frame, and a trailing frame adapted to support seed dropping mechanism, of a supporting wheel pivotally connected with the rear portion of the trailing frame, mechanism connecting the front portion of the trailing frame with the front frame and arranged to raise and lower the front end of the former, means for connecting the supporting wheel with the said mechanism for swinging the supporting wheel upwardly and downwardly simultaneously with the lowering and raising of the front end of the trailing frame and operating means for the said mechanism mounted on the front frame.

2. In an attachment of the class described, the combination with a front plow frame, and a trailing frame adapted to support seed dropping mechanism, of a standard pivotally connected to the rear portion of the trailing frame, a wheel mounted on the standard, mechanism connected with the said frames and with the standard for raising and lowering the front end of the trailing frame and for simultaneously swinging the standard downwardly and upwardly and operating means for the said mechanism mounted on the front frame.

3. In an attachment of the class described, the combination with a front plow frame, and a trailing frame, of a standard pivotally connected with the rear portion of the trailing frame, mechanism connected with the front frame and with the front portion of the trailing frame for raising and lowering the front end of the latter and including an oscillatory arm, a connecting bar extending from the arm to the standard for swinging the latter upwardly and downwardly simultaneously with the lowering and raising of the front end of the trailing frame, and operating means for the said mechanism mounted on the front frame.

4. In an attachment of the class described, the combination with a front plow frame, and a trailing frame adapted to support seed dropping mechanism, of a supporting wheel pivotally connected with the rear portion of the trailing frame, a bell crank member connected with the front frame and with the front portion of the trailing frame for raising and lowering the front end of the latter, means mounted on the plow frame for operating the bell crank member, and means for connecting the supporting wheel with the bell crank member for swinging the said wheel simultaneously with the raising and lowering of the front end of the trailing frame.

5. In an attachment of the class described, the combination with a front plow frame, and a trailing frame, of a lever member having an arm and connected with the front portion of the trailing frame and arranged to raise and lower the front end of the same, supporting means for the rear portion of the trailing frame connected with and actuated by the lever member for raising and lowering the rear end of the said trailing frame simultaneously with the front end, and operating mechanism mounted on the front frame and connected with the lever member for oscillating the same.

6. In an attachment of the class described, the combination with a front plow frame, and a trailing frame, of a bell crank member connected with the front frame and comprising a rearwardly extending arm pivotally connected with the trailing frame at the front portion thereof, and an upwardly extending arm arranged at an angle to the rearwardly extending arm, supporting means for the rear portion of the trailing frame connected with and actuated by the bell crank member for raising and lowering the rear end of the said trailing frame simultaneously with the front end, and an operating lever on the front frame connected with and adapted to operate the bell crank member for raising and lowering the front end of the trailing frame.

7. In an attachment of the class described, the combination with a front frame, and a trailing frame, of mechanism connected with the front frame and including an oscillatory arm pivoted at an intermediate point to the trailing frame and arranged to raise and lower the front end of the same and provided with means located behind the pivotal point and arranged to limit the relative movement of the arm and the trailing frame to form a stiff connection.

8. In an attachment of the class described, the combination with a front frame, and a trailing frame, of mechanism carried by the front frame and including an oscillatory arm pivoted at an intermediate point to the trailing frame and arranged to raise and lower the front end of the same and provided with a terminal lug arranged to engage the trailing frame to limit the relative movement of the same and the said arm.

9. In an attachment of the class described, the combination with a front frame, and a trailing frame, of mechanism carried by the front frame and including a transverse rock shaft, spaced arms extending rearwardly from the rock shaft and connected with the trailing frame at opposite sides thereof for raising and lowering the same, an arm extending upwardly from the rock shaft at an angle to the said arms, supporting means for the rear portion of the trailing frame connected with and actuated by the said mechanism for raising and lowering the rear end of the trailing frame simultaneously with the front end thereof, and an operating lever mounted on the front frame and connected with the said upwardly extending arm.

10. In an attachment of the class described, the combination with a front frame, and a trailing frame, of mechanism carried by the front frame and including a rock shaft, spaced arms extending rearwardly from the rock shaft and pivoted to the trailing frame at opposite sides thereof and provided with means for engaging the said trailing frame for limiting the relative movement of the same and the arms, an arm extending upwardly from the rock shaft, an operating lever mounted on the front frame, and means for connecting the operating lever with the said upwardly extending arm, said means being provided with a spring arranged to yieldably hold the rearwardly extending arms against upward movement.

11. In an attachment of the class described, the combination with a front frame, and a trailing frame, of mechanism carried by the front frame and including a rock shaft, spaced arms extending rearwardly from the rock shaft and pivoted to the trailing frame at opposite sides thereof and provided with means for engaging the trailing frame for limiting the relative movement of the same and the said arms, an arm extending upwardly from the rock shaft, an operating lever mounted on the front frame, and means for connecting the operating lever with the upwardly extending arm, said means comprising a rod extending rearwardly from the lever, a connecting lever slidably receiving the rod, means mounted on the rod and arranged to engage the connecting member in the forward movement of the lever to form a solid connection, and a spring mounted on the rod to engage the connecting member to yieldably hold the same against movement.

12. In an attachment of the class described, the combination with a front frame, and a trailing frame, of mechanism carried by the front frame and including a rock shaft, spaced arms extending rearwardly from the rock shaft and pivoted to the trailing frame at opposite sides thereof and provided with means for engaging the trailing frame for limiting the relative movement of the same and the said arms, an arm extending upwardly from the rock shaft, an operating lever mounted on the front frame, and means for connecting the operating lever with the upwardly extending arm, said means comprising a substantially oblong member having spaced sides and connecting front and rear portions, a rod slidable through the connecting portions and provided with means for engaging the rear connecting portion and having a stop located in advance of the said rear portion, and a coiled spring interposed between the stop and the rear connecting portion.

13. In an attachment of the class described, the combination with a front frame, and a trailing frame, of a support fixed to the front frame and extending rearwardly and laterally therefrom, a bell crank member mounted on the support and having an arm connected with the front portion of the trailing frame, and an operating device mounted on the front frame and connected with the bell crank member, and supporting means for the rear end of the trailing frame connected with and actuated by the said mechanism for raising and lowering the rear end of the trailing frame simultaneously with the front end thereof.

14. In an attachment of the class described, the combination with a front frame, and a trailing frame, of a support rigid with and extending rearwardly from the front frame and composed of a transverse portion and forwardly extending sides having terminal attaching portions secured to the front frame, bearings carried by the rear portion of the support, a rock shaft mounted in the bearings and provided with arms connected with the trailing frame, and an operating lever mounted on the front frame and connected with and adapted to actuate the rock shaft.

15. In an attachment of the class described, the combination with a front frame, and a trailing frame, a support extending from the rear portion of the front frame and provided with bearings, a bell crank member including a rock shaft journaled in the said bearings, and arms extending from the rock shaft and pivotally connected with the front portion of the trailing frame, a supporting wheel pivotally connected with the rear portion of the trailing frame, connections between the supporting wheel and the rock shaft, and means mounted on the front frame and connected with the rock shaft for actuating the same.

16. In an attachment of the class described, the combination with a front plow frame, and a trailing frame, of a bearing pivoted to the rear portion of the trailing frame, a standard having a stem journaled in the bearing, a wheel mounted on the standard, mechanism carried by the front frame and connected with the front portion of the trailing frame for raising and lowering the front end of the same, said mechanism including operating means mounted on the plow frame and means for connecting the standard with the said mechanism to oscillate the standard simultaneously with the raising and lowering of the trailing frame.

17. In an attachment of the class described, the combination with a front frame, and a trailing frame, of a bearing pivotally connected with the rear portion of the trailing frame, a standard having a stem journaled in the bearing, said standard being provided with upper and lower eyes, mechanism carried by the front frame and connected with the front portion of the trailing frame for raising and lowering the front end of the same, and means actuated by the said mechanism and pivoted to one of the eyes of the standard for oscillating the latter.

In testimony, that I claim the foregoing as my own, I have hereto affixed my signature in the presence of two witnesses.

HARRY HARDEN.

Witnesses:
DORA E. BECKER,
HARRY F. FAUVER.